United States Patent
Gordon

(10) Patent No.: US 7,299,012 B2
(45) Date of Patent: Nov. 20, 2007

(54) CIRCUIT TO ADD AND SUBTRACT TWO DIFFERENTIAL SIGNALS

(75) Inventor: Meir Gordon, Holon (IL)

(73) Assignee: Intel Corporation, Santa Clara ( * ) Notice: Subject to any disclaimer, the term of this patent is extended or adjusted under 35 U.S.C. 154(b) by 591 days.

(21) Appl. No.: 10/734,122

(22) Filed: Dec. 15, 2003

(65) Prior Publication Data

US 2005/0130600 A1    Jun. 16, 2005

(51) Int. Cl.
*H04B 17/00* (2006.01)
(52) U.S. Cl. .............. 455/67.15; 455/67.16; 455/41.1; 455/137; 455/176.1; 375/261; 375/268; 375/244; 375/298; 384/476
(58) Field of Classification Search ............ 455/67.15, 455/67.16, 41.1, 137, 176.1; 375/268, 261; 333/35, 165
See application file for complete search history.

(56) References Cited

U.S. PATENT DOCUMENTS

| | | | | |
|---|---|---|---|---|
| 4,462,098 A | * | 7/1984 | D'Avello et al. | 370/281 |
| 5,809,409 A | * | 9/1998 | Itoh et al. | 455/327 |
| 6,556,621 B1 | * | 4/2003 | Richards et al. | 375/150 |
| 6,760,572 B2 | * | 7/2004 | Noori | 455/137 |
| 6,937,667 B1 | * | 8/2005 | Fullerton et al. | 375/295 |
| 6,982,609 B1 | * | 1/2006 | McKay et al. | 333/25 |
| 7,079,869 B2 | * | 7/2006 | Aytur et al. | 455/562.1 |
| 7,164,903 B1 | * | 1/2007 | Cliff et al. | 455/327 |

* cited by examiner

*Primary Examiner*—Marceau Milord
(74) *Attorney, Agent, or Firm*—Pearl Cohen-Zedek Latzer, LLP

(57) ABSTRACT

An electrical circuit to add and subtract differential input signals may be implemented using distributed differential transmission lines having a length substantially equal to one quarter of a wavelength of the differential input signals according to an effective electrical permeability of the transmission line. Alternatively, the electrical circuit may be implemented with lumped reactive elements.

17 Claims, 6 Drawing Sheets

CIRCUIT TO ADD AND SUBTRACT TWO DIFFERENTIAL SIGNALS

BACKGROUND OF THE INVENTION

An electrical circuit to simultaneously add and subtract two differential input signals may have different uses, such as, for example, in radio frequency (RF) applications.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

It should be understood that the present invention may be used in a variety of applications. Although the present invention is not limited in this respect, the circuits disclosed herein may be used in many apparatuses such as the transmitters and receivers of a radio system. Radio systems intended to be included within the scope of the present invention include, by way of example only, cellular radio telephone communication systems, wireless local area networks that meet the existing 802.11a, b, g, and future high data-rate versions of the above, two-way radio communication systems, one-way pagers, two-way pagers, personal communication systems (PCS), Bluetooth wireless communication systems, Zigbee wireless communication systems and the like.

Types of cellular radiotelephone communication systems intended to be within the scope of the present invention include, although not limited to, Direct Sequence-Code Division Multiple Access (DS-CDMA) cellular radiotelephone communication systems, Global System for Mobile Communucations (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, wideband CDMA (WCDMA), General Packet Radio Service (GPRS) systems, Enhanced Data for GSM Evolution (EDGE) systems, 3.5G and 4G systems.

Figure 1:
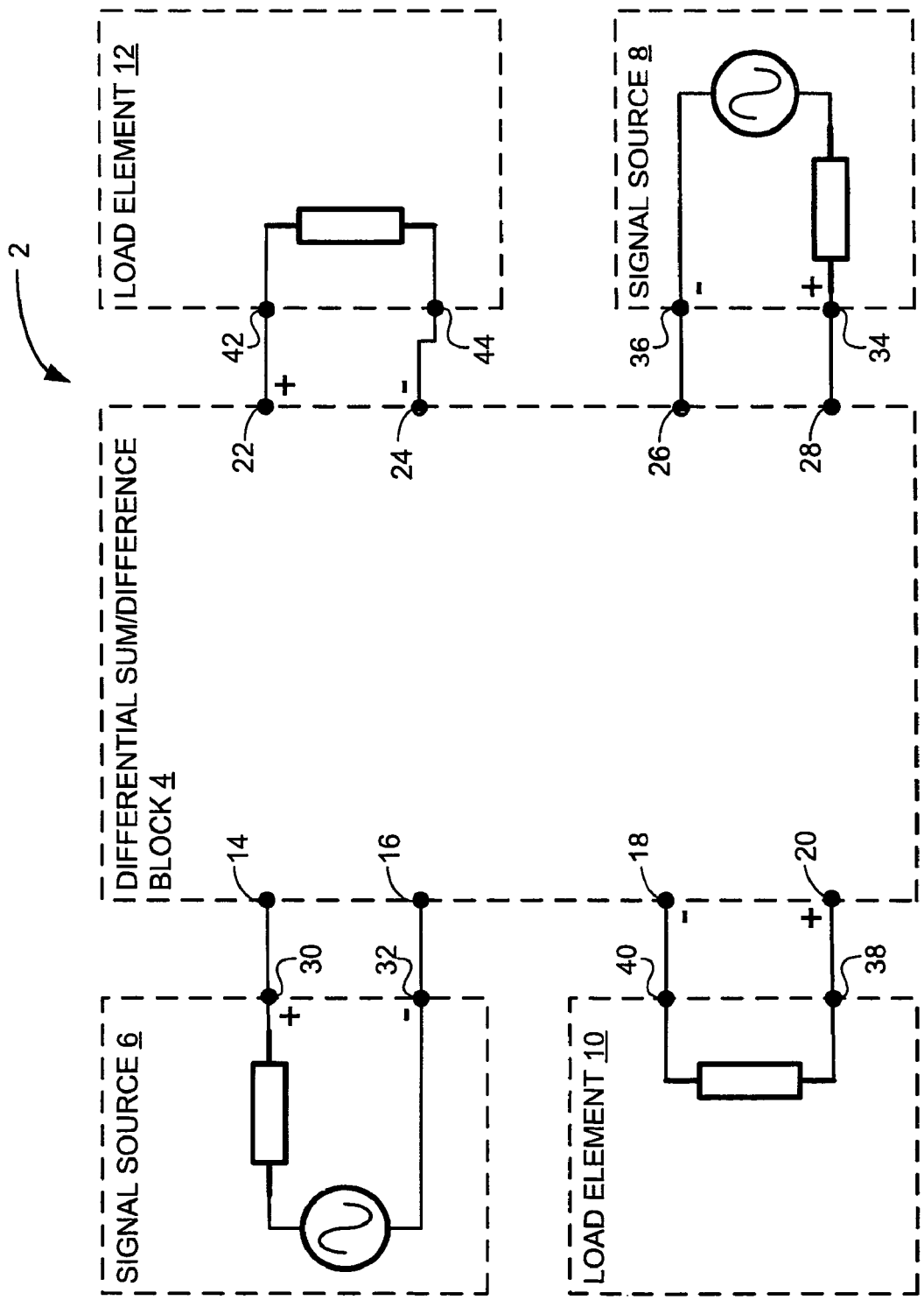
FIG. 1 shows an exemplary block diagram in accordance with some embodiments of the invention.

FIG. 1 shows an exemplary block diagram including an electrical circuit 2 in accordance with some embodiments of the invention. Exemplary electrical circuit 2 may include a differential sum/difference block 4, signal sources 6 and 8, and load elements 10 and 12. Differential sum/difference block 2 may include terminals 14, 16, 18, 20, 22, 24, 26 and 28.

Signal source 6 may have terminals 30 and 32, and may have an output impedance $Z_a$ between terminals 30 and 32, as described in equation (1):

$$Z_a = (a_1 + ja_2), a_1 \geq 0, \tag{1}$$

where j denotes the square root of minus one, $a_1$ is the real component of output impedance $Z_a$ and $a_2$ is the imaginary component of output impedance $Z_a$.

In addition, signal source 6 may generate a differential signal $S_A(t)$ between terminals 30 and 32, having the general form described in Equation (2):

$$S_A(t) = A_A(t) \cdot e^{j2\pi f_A(t)t + j\theta_A(t)} \tag{2}$$

where $A_A(t)$ is the amplitude, $f_A(t)$ is the frequency and $\theta_A(t)$ is the initial phase of the differential signal $S_A(t)$, and t is a time variable.

Signal source 8 may have terminals 34 and 36, and may have an output impedance $Z_b$ between terminals 34 and 36, as described in equation (3):

$$Z_b = (b_1 + jb_2), b_1 \geq 0, \tag{3}$$

where $b_1$ is the real component of output impedance $Z_b$ and $b_2$ is the imaginary component of output impedance $Z_b$.

In addition, signal source 8 may generate a differential signal $S_B(t)$ between terminals 34 and 36, having the general form described in Equation (4):

$$S_B(t) = A_B(t) \cdot e^{j2\pi f_B(t)t + j\theta_B(t)} \tag{4}$$

where $A_B(t)$ is the amplitude, $f_B(t)$ is the frequency and $\theta_B(t)$ is the initial phase of the differential signal $S_B(t)$.

Load element 10 may have terminals 38 and 40, and may have an input impedance $Z_c$ between terminals 38 and 40, as described in equation (5):

$$Z_c = (c_1 + jc_2), c_1 \geq 0 \tag{5}$$

where $c_1$ is the real component of output impedance $Z_c$ and $c_2$ is the imaginary component of output impedance $Z_c$.

Similarly, load element 12 may have terminals 42 and 44, and may have an input impedance $Z_d$ between terminals 42 and 44, as described in equation (6):

$$Z_d = (d_1 + jd_2), d_1 \geq 0, \tag{6}$$

where $d_1$ is the real component of output impedance $Z_d$ and $d_2$ is the imaginary component of output impedance $Z_d$.

Terminals 14 and 16 of a first differential input port of differential sum/difference block 2 may be connected to terminals 30 and 32, respectively. Terminals 18 and 20 of a first differential output port of differential sum/difference block 2 may be connected to terminals 40 and 38, respectively. Terminals 22 and 24 of a second differential output port of differential sum/difference block 2 may be connected to terminals 42 and 44, respectively. Terminals 26 and 28 of a second differential input port of differential sum/difference block 2 may be connected to terminals 36 and 34, respectively.

Although the present invention is not limited in this respect, signal sources 4 and 6 may have substantially equal output impedances, as shown in equation (7):

$$Z_b \approx Z_a = (a_1 + ja_2) \; a_1 \geq 0, \tag{7}$$

and load elements 8 and 10 may have substantially equal input impedances, as shown in equation (8):

$$Z_d \approx Z_c = (c_1 + jc_2) \; c_1 \geq 0. \tag{8}$$

Furthermore, the frequency of differential signal $S_A(t)$ may be substantially equal to the frequency of differential signal $S_B(t)$, as shown in equation (9):

$$f_A(t) \approx f_B(t). \tag{9}$$

Moreover, the output impedance of signal sources 6 and 8 may be substantially active, as shown in equation (10):

$$a_1 >> |a_2|, \tag{10}$$

and the input impedance of load elements 10 and 12 may be substantially active, as shown in equation (11):

$$c_1 >> |c_2|. \tag{11}$$

Differential sum/difference block 4 may output a differential signal $S_C(t)$ at terminals 20 and 18, that may be substantially proportional to the sum of signals $S_A(t)$ and $S_B(t)$, as shown in equation (12):

$$S_C(t) \approx K_1 \cdot \{S_A(t) + S_B(t)\} \cdot e^{j\frac{\pi}{2}\frac{f(t)}{f_0}}, \tag{12}$$

where $K_1$ is a coefficient of proportionality, and $f_0$ is a center frequency of $f_A(t)$.

Furthermore, differential sum/difference block 4 may output a differential signal $S_D(t)$ between terminals 22 and 24 that may be substantially proportional to the difference between signals $S_A(t)$, and $S_B(t)$, as shown in equation (13):

$$S_D(t) \approx K_2 \cdot \{S_A(t) - S_B(t)\} \cdot e^{j\frac{\pi}{2}\frac{f(t)}{f_0}}, \tag{13}$$

where $K_2$ is a coefficient of proportionality.

Consequently differential sum/difference block 4 may be considered a sum-difference combiner.

Figure 2:
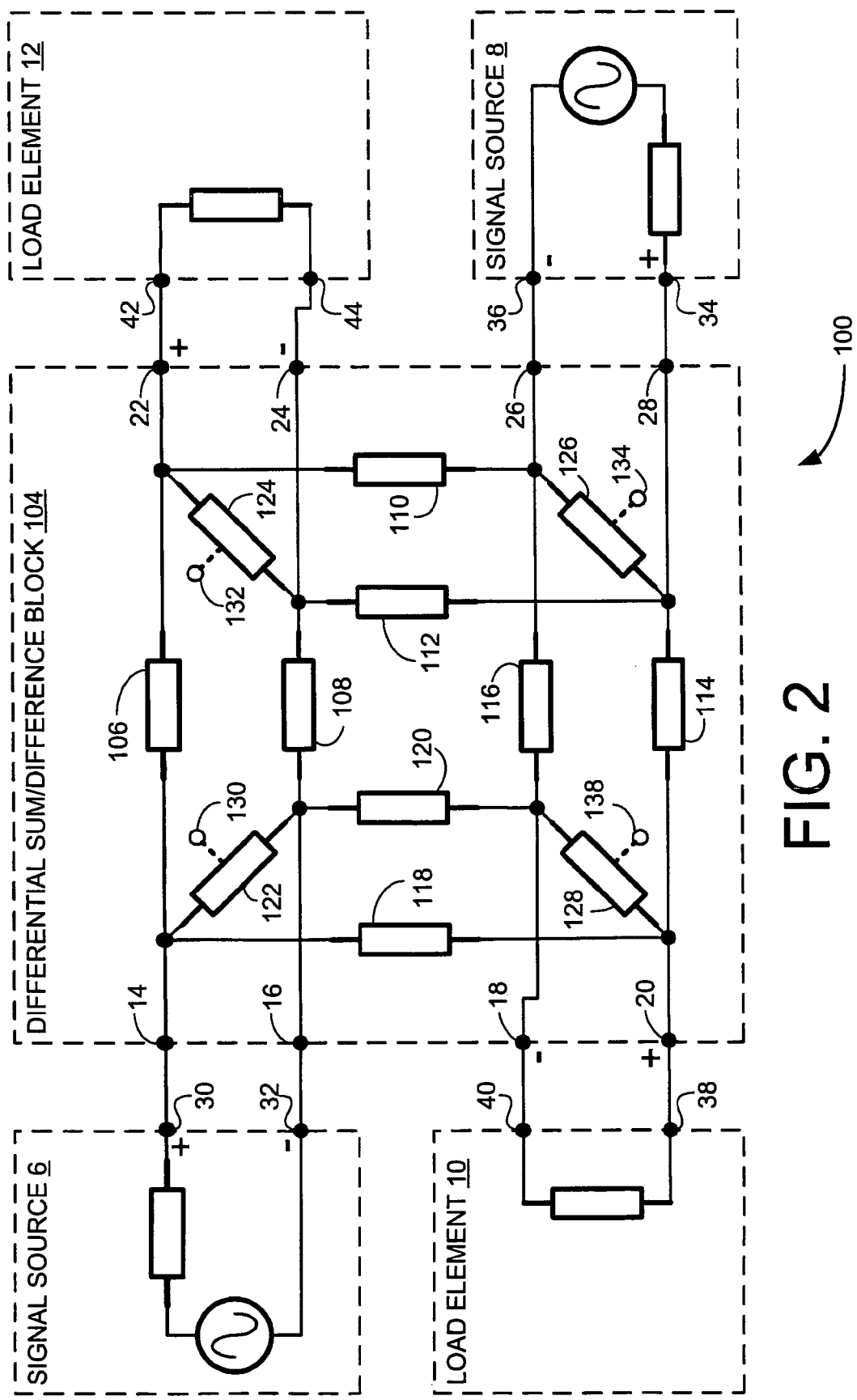
FIG. 2 shows an exemplary electrical circuit including reactive elements in accordance with some embodiments of the invention.

FIG. 2 shows an exemplary differential sum/difference block 104 in accordance with some embodiments of the invention. Differential sum/difference block 104 may be implemented or partially implemented in an integrated circuit assembled on a printed circuit board 100. Those elements of differential sum/difference block 104 that are not implemented in the integrated circuit (which may be all elements of differential sum/difference block 104) may be implemented in the packaging of the integrated circuit, as discrete components assembled on printed circuit board 100, as part of printed circuit board 100, or any combination thereof.

Differential sum/difference block 104 may include lumped reactive elements 106, 108, 110, 112, 114, 116, 118 and 120, having physical dimensions that are significantly smaller than the wavelength $\lambda_A(t)$ that is associated with frequency $f_A(t)$. (The wavelength $\lambda_A(t)$ may be the wavelength of a signal at frequency $f_A(t)$ in a material having an effective electrical permeability similar to that of a lumped reactive element.) Reactive elements 106, 108, 110, 112, 114, 116, 118 and 120 may have a substantially equal impedance $Z_e$, as described in equation (14):

$$Z_e = (e_1 + je_2), \; e_1 \geq 0 \tag{14}$$

where $e_1$ is the real component of impedance $Z_e$ and $e_2$ is the imaginary component of impedance $Z_e$.

Differential sum/difference block 104 may include lumped reactive elements 122, 124, 126 and 128, having physical dimensions that are significantly smaller than the wavelength $\lambda_A(t)$. Reactive elements 122, 124, 126 and 128 may have a substantially equal impedance $Z_f$, as described in equation (15):

$$Z_f = (f_1 + jf_2), f_1 \geq 0 \tag{15}$$

where $f_1$ is the real component of impedance $Z_f$ and $f_2$ is the imaginary component of impedance $Z_f$.

Reactive elements 106, 118 and 122 may be connected to terminal 14.

Reactive elements 108, 120 and 122 may be connected to terminal 16.

Reactive elements 116, 120 and 128 may be connected to terminal 18.

Reactive elements 114, 118 and 128 may be connected to terminal 20.

Reactive elements 106, 110 and 124 may be connected to terminal 22.

Reactive elements 108, 112 and 124 may be connected to terminal 24.

Reactive elements 110, 116 and 126 may be connected to terminal 26.

Reactive elements 112, 114 and 126 may be connected to terminal 28.

According to a first exemplary embodiment of the invention, reactive elements 106, 108, 110, 112, 114, 116, 118 and 120 may have substantially inductive impedances, and reactive elements 122, 124, 126 and 128 may have substantially capacitive impedances, as shown in equations (16) and (17) respectively:

$$Z_e = (e_1 + je_2), \; e_1 \geq 0, \; e_2 \geq 0, \; e_1 << |e_2| \tag{16}$$

$$Z_f = (f_1 + jf_2), f_1 \geq 0, f_2 \leq 0, f_1 << |f_2| \tag{17}$$

Moreover, the impedance of reactive elements 106, 108, 110, 112, 114, 116, 118 and 120 may be substantially twice as much as the impedance of reactive elements 122, 124, 126 and 128, as shown in equation (18):

$$e_2 \approx 2|f_2|. \tag{18}$$

Furthermore, although the scope of the present invention is not limited in this respect, the impedance of reactive elements 106, 108, 110, 112, 114, 116, 118 and 120 may be related to the impedances of signal sources 6 and 8 and to the impedances of load elements 10 and 12, as shown in equation (19):

$$e_2 \approx \sqrt{2a_1 \cdot c_1}. \tag{19}$$

Similarly, the impedance of reactive elements 122, 124, 126 and 128 may be related to the impedances of signal sources 6 and 8 and to the impedances of load elements 10 and 12, as shown in equation (20):

$$f_2 \approx -\sqrt{\frac{a_1 \cdot c_1}{2}}. \tag{20}$$

Differential signal $S_C(t)$ may be substantially proportional to the sum of $S_A(t)$ and $S_B(t)$, as shown in equation (12), and differential signal $S_D(t)$ may be substantially proportional to the difference between $S_A(t)$ and $S_B(t)$, as shown in equation (13).

According to a second exemplary embodiment of the invention, reactive elements 106, 108, 110, 112, 114, 116, 118 and 120 may have substantially capacitive impedances, and reactive elements 122, 124, 126 and 128 may have substantially inductive impedances, as shown in equations (21) and (22) respectively:

$$Z_e = (e_1 + je_2), \ e_1 \geq 0, \ e_2 \leq 0, \ e_1 << |e_2| \tag{21}$$

$$Z_f = (f_1 + jf_2), \ f_1 \geq 0, \ f_2 \geq 0, \ f_1 << |f_2|. \tag{22}$$

The impedance of reactive elements 106, 108, 110, 112, 114, 116, 118 and 120 may be substantially twice as much as the impedance of reactive elements 122, 124, 126 and 128, as shown in equation (23):

$$f_2 \approx 2|e_2|. \tag{23}$$

Furthermore, although the scope of the present invention is not limited in this respect, the impedance of refactive elements 106, 108, 110, 112, 114, 116, 118 and 120 may be related to the impedances of signal sources 6 and 8 and the impedances of load elements 10 and 12, as shown in equation (24):

$$e_2 \approx -\sqrt{2a_1 \cdot c_1}. \tag{24}$$

Similarly, the impedance of reactive elements 122, 124, 126 and 128 may be related to the impedances of signal sources 6 and 8 and the impedances of load elements 10 and 12, as shown in equation (25):

$$f_2 \approx 2\sqrt{2a_1 \cdot c_1}. \tag{25}$$

Differential signal $S_C(t)$ may be substantially proportional to the sum of $S_A(t)$ and $S_B(t)$, as shown in equation (12), and differential signal $S_D(t)$ may be substantially proportional to the difference between $S_A(t)$ and $S_B(t)$, as shown in equation (13).

The second embodiment, described above, may be modified to include center taps 130, 132, 134 and 136 for reactive elements 122, 124, 126 and 128, respectively. Center taps 130, 132, 134 and 136 may be optionally connected to a supply or a supply return signal (not shown).

In both the first and second exemplary embodiments, a non-exhaustive list of examples for the reactive elements having substantially capacitive impedances includes a surface mounted device (SMI) capacitor located on a printed circuit board (PCB), a SMD capacitor located on a substrate of an integrated circuit (IC) device, a through-hole capacitor, a metal-insulator-metal (MIM) capacitor, a metal-oxide semiconductor (MOS) capacitor, poly capacitor, and the like.

In both the first and second exemplary embodiments, a non-exhaustive list of examples for the reactive elements having substantially inductive impedances includes a SMD inductor located on a PCB, a SMD inductor located on a substrate of an IC device, a through-hole inductor, a planar on-chip inductor, and the like.

In the case of substantially inductive reactive elements having center taps, a non-exhaustive list of examples includes any combination of an SMI differential inductor located on a PCB, a SMD differential inductor located on a substrate of an IC device, a through-hole differential inductor, a planar on-chip differential inductor with a center tap, and the like.

Figure 3:
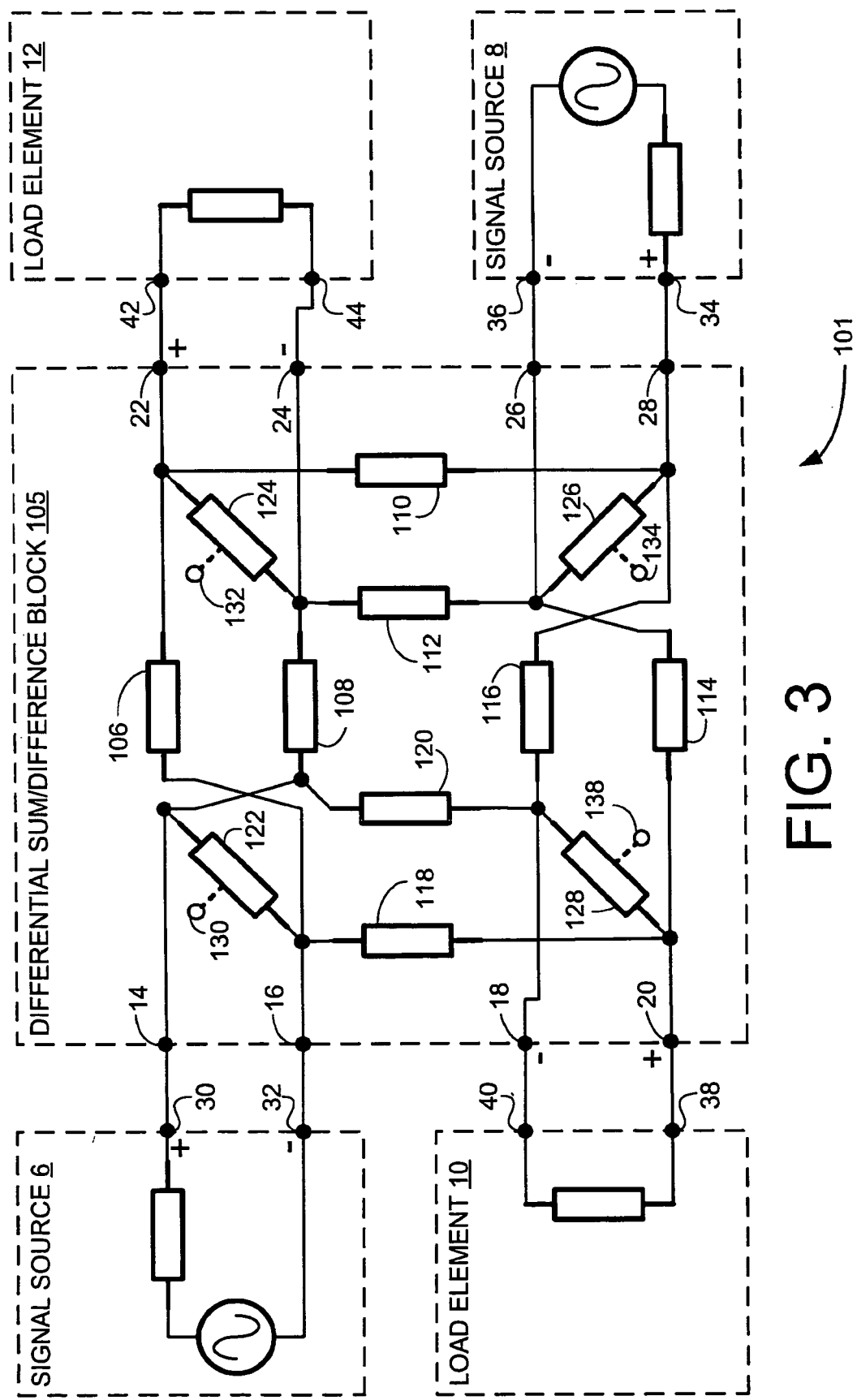
FIG. 3 shows an alternate exemplary electrical circuit including reactive elements in accordance with some embodiments of the invention.

FIG. 3 shows an alternate exemplary differential sum/difference block 105 in accordance with some embodiments of the invention. Differential sum/difference block 105 may be implemented or partially implemented in an integrated circuit assembled on a printed circuit board 101. Those elements of differential sum/difference block 105 that are not implemented in the integrated circuit (which may be all elements of differential sum/difference block 105) may be implemented in the packaging of the integrated circuit, as discrete components assembled on printed circuit board 101, as part of printed circuit board 101, or any combination thereof.

Differential sum/difference block 105 may include lumped reactive elements 106, 108, 110, 112, 114, 116, 118 and 120, as described hereinabove with respect to FIG. 2. The physical dimensions and impedances of reactive elements 106, 108, 110, 112, 114, 116, 118 and 120 may be as described hereinabove with respect to FIG. 2. Moreover, as described hereinabove with respect to FIG. 2, differential sum/difference block 105 may include center taps 130, 132, 134 and 136 for reactive elements 122, 124, 126 and 128, respectively. Center taps 130, 132, 134 and 136 may be optionally connected to a supply or a supply return signal (not shown).

Reactive elements 108, 118 and 122 may be connected to terminal 14.

Reactive elements 106, 120 and 122 may be connected to terminal 16.

Reactive elements 116, 120 and 128 may be connected to terminal 18.

Reactive elements 114, 118 and 128 may be connected to terminal 20.

Reactive elements 106, 110 and 124 may be connected to terminal 22.

Reactive elements 108, 112 and 124 may be connected to terminal 24.

Reactive elements 112, 114 and 126 may be connected to terminal 26.

Reactive elements 110, 116 and 126 may be connected to terminal 28.

Figure 4:
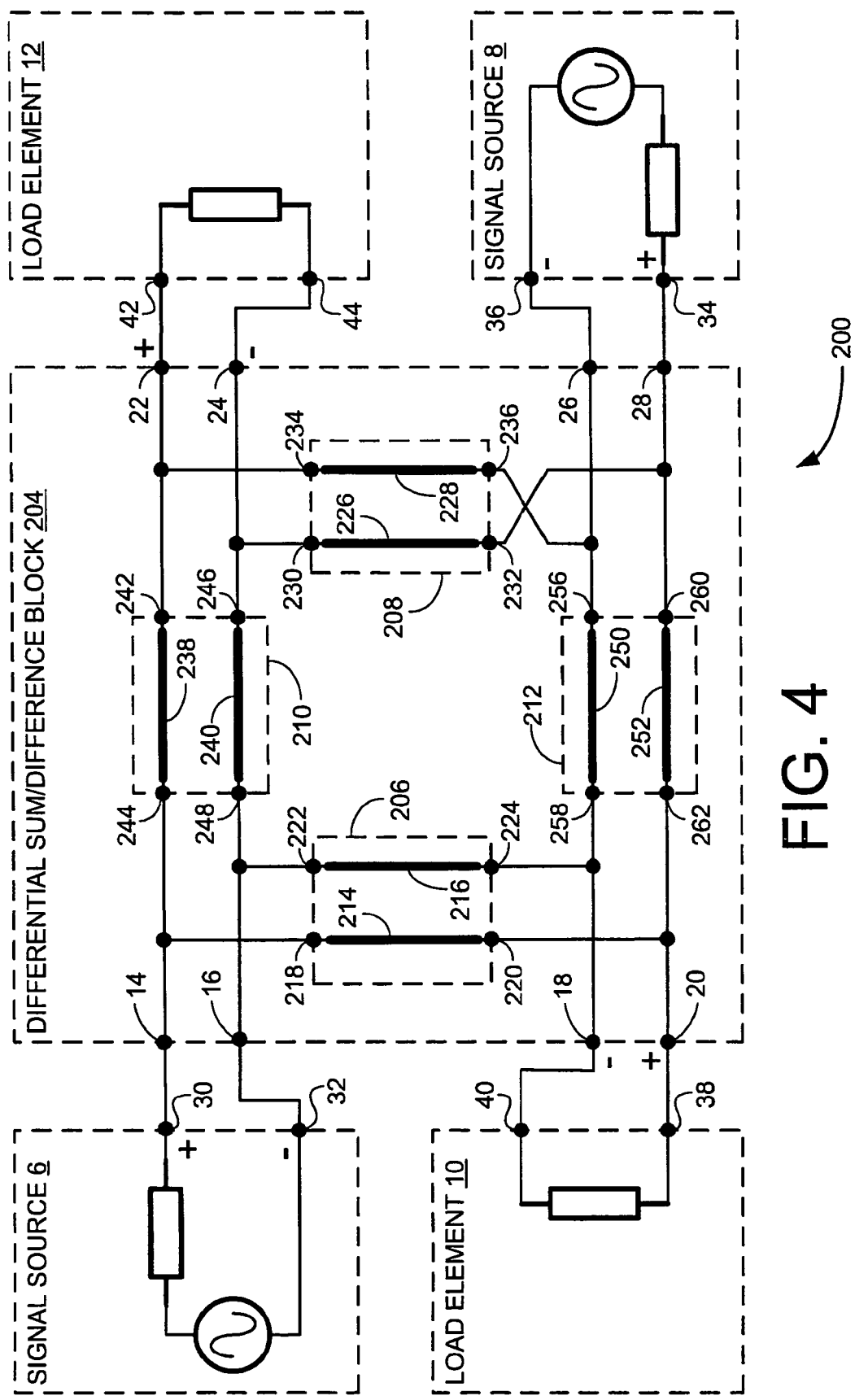
FIG. 4 shows an exemplary electrical circuit including transmission lines in accordance with some embodiments of the invention.

FIG. 4 shows an exemplary distributed differential sum/difference block 204 in accordance with some embodiments of the invention. Differential sum/difference block 204 may be implemented on a printed circuit board 200 or any other suitable implementation.

Differential sum/difference block 204 may include distributed differential transmission lines 206, 208, 210 and 212, having physical dimensions substantially equal to one quarter of the wavelength $\lambda_A(t)$ (the wavelength $\lambda_A(t)$ may be the wavelength of a signal at frequency $f_A(t)$ in a material having an effective electrical permeability similar to that of a transmission line), and having a substantially equal impedance $Z_h$, as described in equation (26):

$$Z_h = (h_1 + jh_2), \ h_1 \geq 0, \ h_1 \geq \geq |h_2| \tag{26}$$

where $h_1$ is the real component of impedance $Z_h$ and $h_2$ is the imaginary component of impedance $Z_h$.

Impedance $Z_h$ may be related to the impedances of signal sources 4 and 6 and to the impedances of load elements 8 and 10, as shown in equation (27):

$$h_1 \approx \sqrt{2a_1 \cdot c_1}. \tag{27}$$

Distributed differential transmission line 206 may include a conductor 214 and a conductor 216. Distributed differential transmission line 206 may have terminals 218 and 220 connected to conductor 214, and may have terminals 222 and 224 connected to conductor 216. Terminals 218 and 222 may be associated with a first physical end of distributed differential transmission line 206, while terminals 220 and 224 may be associated with a second physical end of distributed differential transmission line 206.

Distributed differential transmission line 208 may include a conductor 226 and a conductor 228. Distributed differential transmission line 208 may have terminals 230 and 232 connected to conductor 226, and may have terminals 234 and 236 connected to conductor 228. Terminals 230 and 234 may be associated with a first physical end of distributed differential transmission line 208, while terminals 232 and 236 may be associated with a second physical end of distributed differential transmission line 208.

Distributed differential transmission line 210 may include a conductor 238 and a conductor 240. Distributed differential transmission line 210 may have terminals 242 and 244 connected to conductor 238, and may have terminals 246 and 248 connected to conductor 240. Terminals 242 and 246 may be associated with a first physical end of distributed differential transmission line 210, while terminals 244 and 248 may be associated with a second physical end of distributed differential transmission line 210.

Distributed differential transmission line 212 may include a conductor 250 and a conductor 252. Distributed differential transmission line 212 may have terminals 256 and 258 connected to conductor 250, and may have terminals 260 and 262 connected to conductor 252. Terminals 256 and 260 may be associated with a first physical end of distributed differential transmission line 212, while terminals 258 and 262 may be associated with a second physical end of distributed differential transmission line 212.

Terminals 218 and 244 may be connected to terminal 14.
Terminals 222 and 248 may be connected to terminal 16.
Terminals 224 and 258 may be connected to terminal 18.
Terminals 220 and 262 may be connected to terminal 20.
Terminals 234 and 242 may be connected to terminal 22.
Terminals 230 and 246 may be connected to terminal 24.
Terminals 236 and 256 may be connected to terminal 26.
Terminals 232 and 260 may be connected to terminal 28.

A non-exhaustive list of examples for distributed differential transmission lines 206, 208, 210 and 212 may include a differential micro-strip transmission line, a differential strip-line transmission line, a differential waveguide, a differential coaxial cable, and the like.

Differential signal $S_C(t)$ may be substantially proportional to the sum of $S_A(t)$ and $S_B(t)$, as shown in equation (12), and differential signal $S_D(t)$ may be substantially proportional to the difference between $S_A(t)$ and $S_B(t)$, as shown in equation (13).

Figure 5:
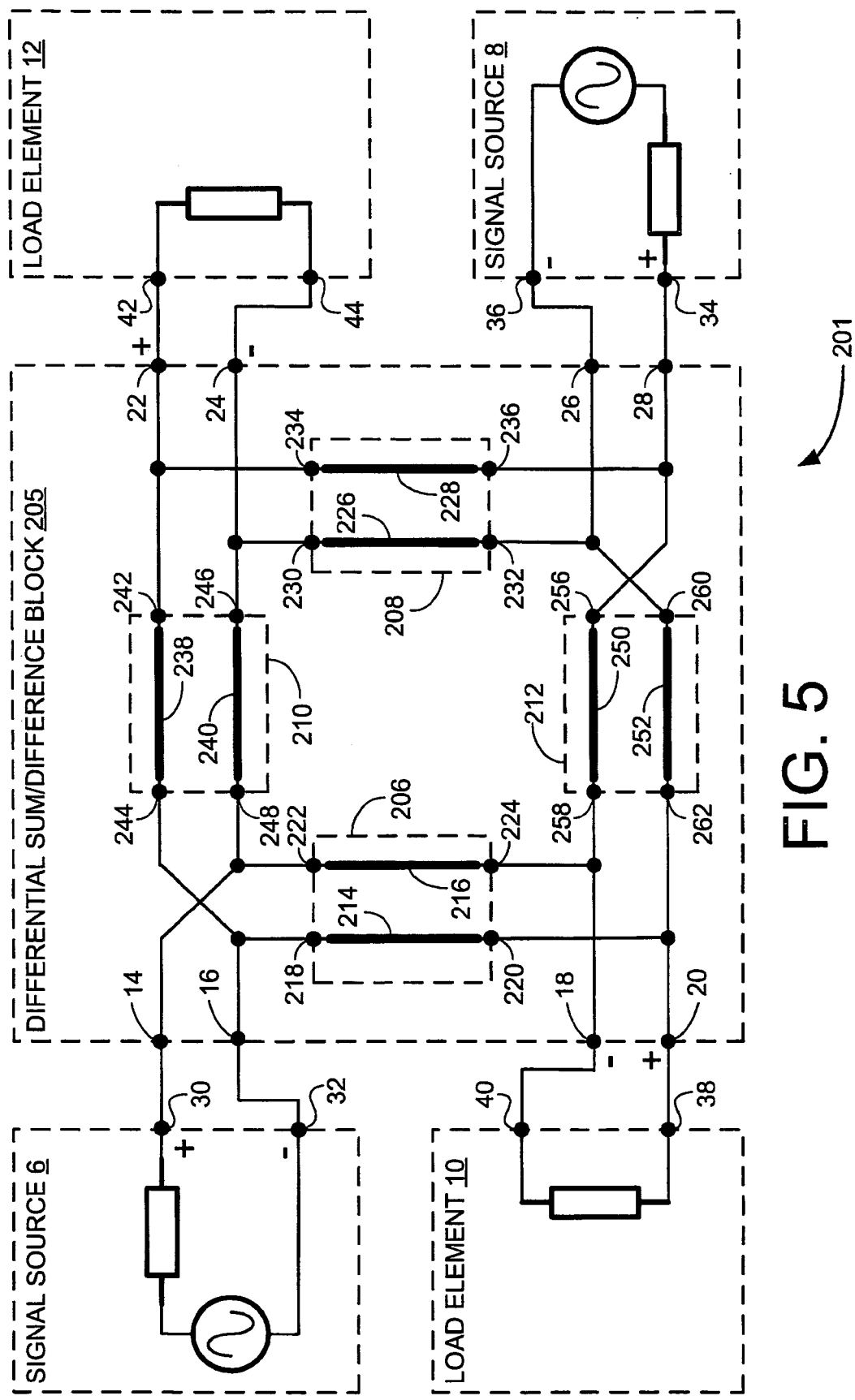
FIG. 5 shows an alternate exemplary electrical circuit including transmission lines in accordance with some embodiments of the invention.

FIG. 5 shows an alternate exemplary differential sum/difference block 205 in accordance with some embodiments of the invention. Differential sum/difference block 205 may be implemented on a printed circuit board 201 or any other suitable implementation.

Differential sum/difference block 205 may include distributed differential transmission lines 206, 208, 210 and 212, as described hereinabove with respect to FIG. 4. The physical dimensions and impedances of distributed differential transmission lines 206, 208, 210 and 212 may be as described hereinabove with respect to FIG. 4.

Terminals 222 and 248 may be connected to terminal 14.
Terminals 218 and 244 may be connected to terminal 16.
Terminals 224 and 258 may be connected to terminal 18.
Terminals 220 and 262 may be connected to terminal 20.
Terminals 234 and 242 may be connected to terminal 22.
Terminals 230 and 246 may be connected to terminal 24.
Terminals 232 and 260 may be connected to terminal 26.
Terminals 236 and 256 may be connected to terminal 28.

Figure 6:
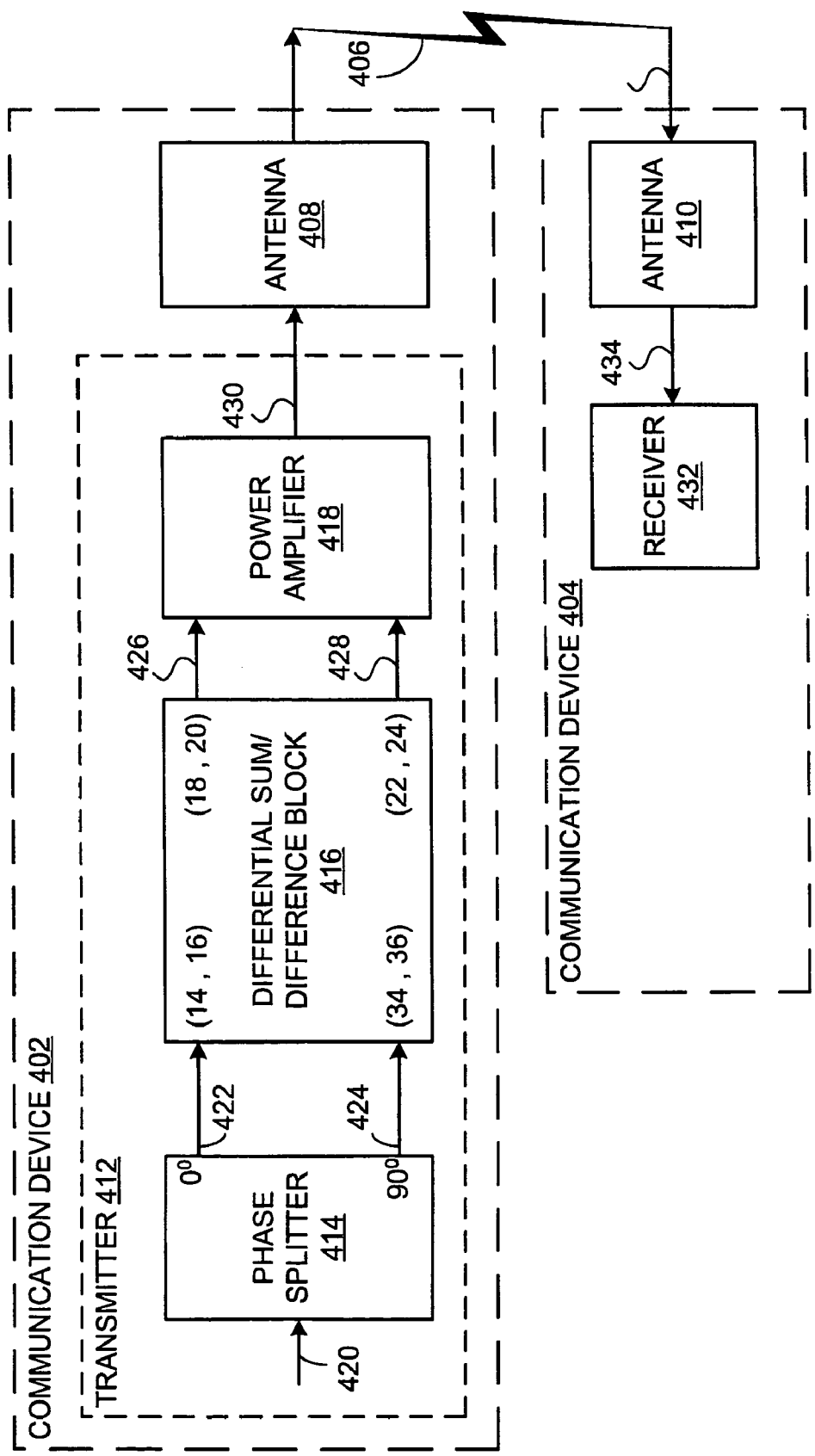
FIG. 6 is a simplified block-diagram illustration of an exemplary communication system, in accordance with some embodiments of the present invention.

FIG. 6 is a simplified block-diagram illustration of an exemplary communication system, in accordance with some embodiments of the present invention. A communication device 402 is able to communicate with a communication device 404 over a communication channel 406. A transmitter according to embodiments of the present invention may be present in communication device 402 only or in communication device 404 only or in both communication devices 402 and 404. The following description is based on the example of a transmitter according to one or another of the embodiments of the present invention present in communication device 402 only, although the present invention is not limited in this respect.

Although the present invention is not limited in this respect, the communication system shown in FIG. 6 may be part of a cellular communication system, with one of communication devices 402, 404 being a base station and the other a mobile station or with both communication devices 402, 404 being mobile stations, a pager communication system, a personal digital assistant and a server, etc. Communication devices 402 and 404 may include antennas 408 and 410, respectively, which may be, for example, dipole antennas, loop antennas, shot antennas dual antennas, omni-directional antennas or any other suitable antennas.

Communication device 402 may include a transmitter 412 that may include a phase splitter 414, a differential sum/difference block 416 and a power amplifier 418. Phase splitter outphasing 414 may receive a differential signal 420 that may contain information to be transmitted, and may output differential phase shifted signals 422 and 424 having amplitudes substantially similar to the amplitude of signal 420. Differential phase shifted signal 424 may have a phase delay of substantially 90° relative to differential phase shifted signal 422.

Differential sum/difference block 416 may receive differential phase shifted signals 422 and 424 as inputs and may output a differential sum outphased signal 426, and a differential difference outphased signal 428.

Power amplifier 418 may receive differential sum outphased signal 426 and may amplify it, using for example, a first power amplifying element (not shown). Similarly, power amplifier 418 may receive differential difference outphased signal 428 and may amplify it, using for example, a second power amplifying element (not shown). Although the present invention is not limited in this respect, power amplifier 418 may combine these amplified signals by means of, for example, a transmission-line-combiner with reactive shunt terminations, and may output an RF signal 430 that may then be transmitted by antenna 408 over communication channel 406. Alternatively, the transmission-line-combiner may be replaced by a different combiner scheme, such as, for example, Hybrid BALUN or center-tap inductor.

Communication device 404 may include a receiver 432. Receiver 432 may receive a modulated data signal 434 from communication channel 406 via antenna 410, and may, for example, extract the information contained in signal 434 by, for example, downconverting and demodulating signal 434.

It will be appreciated by persons of ordinary skill in the art that communication devices 402 and 404, and in particular transmitter 412 and receiver 432, may include additional components that are not shown in FIG. 4 so as not to obscure the description of embodiments of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A combiner comprising:
   a circuit comprising a first group of six reactive elements to couple two differential input ports to two differential output ports in a first manner;
   a second group of two reactive elements to couple one of said two differential input ports to one of said two differential output ports in a second, different manner; and
   a third group of four reactive elements, each to couple a positive terminal and a negative terminal of a respective one of said two differential input ports and said two differential output ports; wherein reactive elements of said first group and said second group have substantially equivalent inductive impedances and reactive elements of said third group have substantially equivalent capacitive impedances.

2. The apparatus of claim 1, wherein said first manner is to couple positive terminals to positive terminals and to couple negative terminals to negative terminals, and said second manner is to couple positive terminals to negative terminals.

3. The apparatus of claim 1, wherein said first manner is to couple positive terminals to negative terminals, and said second manner is to couple positive terminals to positive terminals and to couple negative terminals to negative terminals.

4. The apparatus of claim 1, wherein at least one of said reactive elements is a discrete component.

5. The apparatus of claim 1, wherein reactive elements of said first group and said second group have substantially equivalent capacitive impedances and reactive elements of said third group have substantially equivalent inductive impedances.

6. The apparatus of claim 5, further comprising:
   a supply coupled to center taps of said reactive elements of said third group.

7. The apparatus of claim 5, further comprising:
   a supply return coupled to center taps of said reactive elements of said third group.

8. A communication device comprising:
   a dipole antenna;
   a power amplifier coupled to said dipole antenna; and
   a combiner coupled to said power amplifier, wherein said combiner includes at least:
      a first group of six reactive elements to couple two differential input ports to two differential output ports in a first manner;
      a second group of two reactive elements to couple one of said two differential input ports to one of said two differential output ports in a second, different manner; and
      a third group of four reactive elements, each to couple a positive terminal and a negative terminal of a respective one of said two differential input ports and said two differential output ports.

9. The communication device of claim 8, wherein said first manner is to couple positive terminals to positive terminals and to couple negative terminals to negative terminals, and said second manner is to couple positive terminals to negative terminals.

10. The communication device of claim 8, wherein said first manner is to couple positive terminals to negative terminals, and said second manner is to couple positive terminals to positive terminals and to couple negative terminals to negative terminals.

11. The communication device of claim 8, wherein reactive elements of said first group and said second group have substantially equivalent inductive impedances and reactive elements of said third group have substantially equivalent capacitive impedances.

12. The communication device of claim 8, wherein reactive elements of said first group and said second group have substantially equivalent capacitive impedances and reactive elements of said third group have substantially equivalent inductive impedances.

13. A communication system comprising:
   a first communication device; and
   a second communication device, said second communication device including at least:
      a combiner including at least:
         a first group of six reactive elements to couple two differential input ports to two differential output ports in a first manner;
         a second group of two reactive elements to couple one of said two differential input ports to one of said two differential output ports in a second, different manner; and
         a third group of four reactive elements, each to couple a positive terminal and a negative terminal of a respective one of said two differential input ports and said two differential output ports.

14. The communication device of claim 13, wherein said first manner is to couple positive terminals to positive terminals and to couple negative terminals to negative terminals, and said second manner is to couple positive terminals to negative terminals.

15. The communication device of claim 13, wherein said first manner is to couple positive terminals to negative terminals, and said second manner is to couple positive terminals to positive terminals and to couple negative terminals to negative terminals.

16. The communication device of claim 13, wherein reactive elements of said first group and said second group have substantially equivalent inductive impedances and reactive elements of said third group have substantially equivalent capacitive impedances.

17. The communication device of claim 13, wherein reactive elements of said first group and said second group have substantially equivalent capacitive impedances and reactive elements of said third group have substantially equivalent inductive impedances.

* * * * *